United States Patent [19]

Birk

[11] Patent Number: 4,621,225
[45] Date of Patent: Nov. 4, 1986

[54] PASSIVE TRANSFORMERLESS BATTERY CHARGING CIRCUIT

[75] Inventor: Daniel J. Birk, Aurora, Ill.

[73] Assignee: Pittway Corporation, Aurora, Ill.

[21] Appl. No.: 577,218

[22] Filed: Feb. 6, 1984

[51] Int. Cl.⁴ .............................................. H02J 7/00
[52] U.S. Cl. ...................................... 320/21; 320/23; 320/40; 320/48; 320/59
[58] Field of Search ...................... 320/21, 22, 23, 39, 320/40, 48, 59

[56] References Cited

U.S. PATENT DOCUMENTS

| | | | |
|---|---|---|---|
| 3,305,755 | 2/1967 | Walsh | 320/21 |
| 3,327,198 | 6/1967 | Rauch | 320/14 |
| 3,356,928 | 12/1967 | Parrish | |
| 3,413,537 | 11/1968 | Sharp et al. | 320/27 |
| 4,177,413 | 12/1979 | Ascoli | 320/2 |
| 4,281,278 | 7/1981 | Bilsky et al. | 320/13 |
| 4,323,960 | 4/1982 | Jones | 363/48 |

OTHER PUBLICATIONS

"Battery Application Manual", Gates Energy Products, Inc., pp. 39–48, 1980.

"The Sealed Lead Battery Handbook", General Electric Company, pp. 5, 7, 39–43, 96 and 97, 1980.

Primary Examiner—Peter S. Wong
Assistant Examiner—Anita M. Ault
Attorney, Agent, or Firm—Emrich & Dithmar

[57] ABSTRACT

A flashlight battery charging circuit includes a diode bridge which full-wave rectifies an AC voltage supplied from a 120 VAC supply through a coupling capacitor. The output terminals of the bridge are coupled to the battery through a Zener diode circuit which terminates current flow from the bridge to the battery when the battery voltage reaches a predetermined level. A storage capacitor has one terminal thereof connected to the coupling capacitor and the other terminal thereof connected to the output of the rectifying bridge through a diode and to the battery through a current-limiting resistor and an LED. The storage capacitor is charged during alternate half cycles of the AC supply voltage to a relatively high voltage and on the remaining half cycles is discharged through the current-limiting resistor and the LED to supply to the battery a limited current at a relatively high voltage.

20 Claims, 1 Drawing Figure

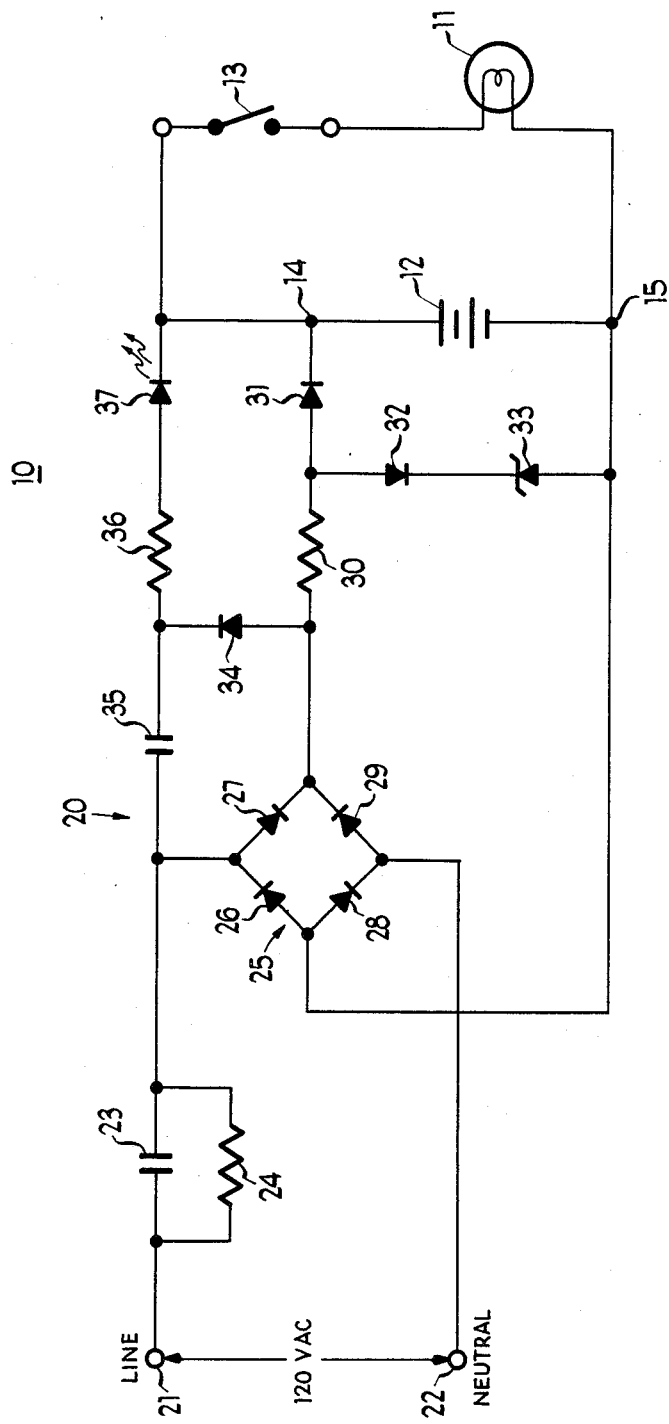

PASSIVE TRANSFORMERLESS BATTERY CHARGING CIRCUIT

BACKGROUND OF THE INVENTION

The present invention relates to battery charging circuits and, in particular, to circuits for charging low-voltage rechargeable batteries, such as lead-acid batteries, from an AC supply voltage. The invention has particular application to the recharging of batteries of the type used in small flashlights and other portable devices.

The present invention is an improvement of the battery charging circuit disclosed in copending application Ser. No. 407,719, filed Aug. 13, 1982, entitled "BATTERY CHARGING FLASHLIGHT CIRCUIT", now U.S. Pat. No. 4,460,863, issued July 17, 1984. That charging circuit is a two-step constant current charging circuit which operates to provide to the battery two separate charging currents, viz., a high current at a relatively low voltage which is terminated when the battery has been charged to a predetermined charge level, and a limited current at a relatively high voltage which is continually supplied to the battery. This high voltage charging current operates to facilitate charging of batteries which have been deeply discharged with resulting sulfate buildup on the electrodes. This initial high-voltage charging current helps to breakdown the sulfation and facilitate the acceptance of the full charging current by the battery. After the battery has been substantially fully charged and the low voltage charging current has been switched off, the high voltage current continues to afford a "trickle" charge to maintain the desired charge level without excessively overcharging the battery.

That prior battery charging circuit utilizes a transformer with a tapped secondary to provide the two different charging voltages. The transformer is a relatively expensive and heavy element, which significantly increases the cost and weight of the battery charging circuit. Furthermore, the transformer generates significant amounts of heat inside the product. Also, the transformer supply presents a substantially resistive impedance to the AC line, resulting in an unfavorable power factor.

SUMMARY OF THE INVENTION

The present invention relates to an improved battery charging circuit which avoids the disadvantages of prior charging circuits while affording additional structural and operating advantages.

It is a general object of this invention to provide a two-step constant current battery charger which is of simple and economical construction.

In connection with the foregoing object, it is another object of this invention to provide a battery charging circuit of the type set forth, which is relatively lightweight and utilizes no active components.

Still another object of the invention is the provision of a battery charging circuit of the type set forth, which generates minimal amounts of heat.

In connection with the foregoing objects, it is another object of this invention to provide a charging circuit of the type set forth, which does not utilize a transformer.

These and other objects of the invention are attained by providing a charging circuit for charging a low voltage battery from an AC supply voltage, the charging circuit comprising: input terminals adapted to be connected to the AC supply and output terminals adapted to be connected to an associated battery, first and second charging means, means capacitively coupling the first and second charging means to said input terminals, the first charging means including means for providing to the battery at the output terminals a rectified relatively large charging current at a relatively low output voltage, the second charging means including means for providing to the battery at the output terminals during alternate half cycles of the AC supply voltage limited charging current at a relatively high output voltage, the first charging means including control means for terminating the current flow from the first charging means to said output terminals when the voltage of the associated battery reaches a predetermined level.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWING

For the purpose of facilitating an understanding of the invention, there is illustrated in the accompanying drawing a preferred embodiment thereof, from an inspection of which, when considered in connection with the following description, the invention, its construction and operation, and many of its advantages should be readily understood and appreciated.

The one FIGURE is a schematic circuit diagram of a battery charging flashlight circuit constructed in accordance with and embodying the features of the present invention.

DESCRIPTION OF THE PREFERRED EMBODIMENT

There is illustrated in the drawing a flashlight circuit, generally designated by the numeral 10, which includes a lamp 11 and is adapted to be powered by a battery 12, two series-connected battery cells being illustrated in the drawing. It will, however, be appreciated that any desired number of battery cells could be used. The cells of the battery 12 are of the rechargeable type, and are preferably of the lead-acid variety, such as those manufactured by Gates Engineering Products, Inc. under Model No. 0810-0004, "D" CELL. However, it will be appreciated that the present invention may be adapted for use with other types of rechargeable batteries.

The anode of the battery 12 is connected to one terminal of the lamp 11 through a manually-operated single-pole, single-throw switch 13 for controlling the operation of the lamp 11 in a known manner. The other terminal of the lamp 11 is connected to the cathode of the battery 12. The anode and cathode of the battery 12 are also respectively connected to the output terminals 14 and 15 of a charging circuit, generally designated by the numeral 20, which is also provided with input terminals 21 and 22, adapted to be connected across a 120 VAC supply. The input terminal 21 is connected to one terminal of a capacitor 23 which is shunted by a resistor 24, the other terminal of the capacitor 23 being connected to one of the input terminals of a full-wave rectifying diode bridge 25 which includes diodes 26, 27, 28 and 29. The other input terminal of the diode bridge 25 is connected to the input terminal 22 of the charging circuit 20. One of the output terminals of the diode bridge 25 is connected to the output terminal 15 of the charging circuit 20, while the other output terminal of the diode bridge 25 is connected to the output terminal 14 of the charging circuit 20 through a series-connected resistor 30 and diode 31. The junction between the resistor 30 and the diode 31 is connected to the anode of a diode 32, the cathode of which is connected to the cathode of a Zener diode 33 which has its anode connected to the output terminal 15.

The output terminal of the diode bridge 25 which is connected to the resistor 30 is also connected to the anode of a diode 34, which has its cathode connected to one terminal of a storage capacitor 35, the other terminal of which is connected to the coupling capacitor 23. Connected in series between the capacitor 35 and the output terminal 14 are a current-limiting resistor 36 and a light-emitting diode (LED) 37.

In operation, the coupling capacitor 23 couples the AC line voltage to the input of the diode bridge 25 and produces a large voltage drop so that the input AC voltage to the diode bridge 25 is substantially reduced. The resistor 24 is for the purpose of bleeding off charge which might be stored in the capacitor 23 when the charging circuit 20 is disconnected from the AC supply. The AC input voltage is full-wave rectified by the diode bridge 25, and this rectified voltage is then applied across the diode 32 and the Zener diode 33 which clamp the peak voltage to a value substantially less than than which can be delivered from the diode bridge 25. The Zener voltage is selected to be approximately the same as the specified voltage required for fully charging the battery 12 while maintaining overcharge or "trickle charge" current within acceptable limits, since if the overcharge current is too high, oxidation may result which will shorten the life of the battery 12. The value of the resistor 30 is relatively low, so that a relatively high charging current flows therethrough, preferably in the range of about 120-160 ma.

Thus, when the battery voltage is below its predetermined specified full-charge voltage, all of the relatively high charging current from the diode bridge 25 will flow to the battery 12 through the diode 31. When the battery 12 reaches the predetermined full-charge voltage the Zener diode 33 will start conducting, so that the current from the diode bridge 25 will no longer flow to the battery 12, but will flow through the diode 32 and the Zener diode 33. Thus, the Zener diode 33 regulates the charging voltage and effectively serves as an electronic switch which stops providing the high charging current to the battery 12 once it is charged to a predetermined voltage. The diode 31 is provided to prevent the battery 12 from discharging back through the Zener diode 33. The diode 32 is provided to compensate for the forward voltage drop of the diode 31.

It is a significant aspect of the present invention that there is continually supplied to the battery 12 a relatively high-voltage, half-wave rectified and limited charging current from the capacitor 35. In this regard, the capacitor 35, the diode 34, the resistor 36 and the LED 37 cooperate with the diode bridge 25 to act as a "charge pump" which supplies a limited high-voltage charging current to the battery 12 on alternate half cycles of the AC line voltage.

More particularly, on those half-cycles where the line input terminal 21 is negative with respect to the neutral input terminal 22, the diodes 27 and 28 are back biased.

In this event, the capacitor 35 is quickly charged through the diodes 29 and 34 to a limit which is determined by the values of the other elements in the circuit and the condition of the battery 12. Preferably, the circuit element values are such that when the battery 12 is fully charged, the capacitor 35 will be charged to about 8.3 volts, in the case where the battery 12 comprises 2-volt "D" cells. It will be appreciated that when the battery 12 is not fully charged, more of the charging current from the diode bridge 25 will flow to the battery 12 and, accordingly, the capacitor 35 will be charged to a voltage less than 8.3 volts.

On the next half cycle of the AC line voltage, when the line input terminal 21 is positive with respect to the neutral input terminal 22, the diodes 26, 29 and 34 will be back biased. In this event, the voltage across the capacitor 35 adds to the voltage across the reverse-biased bridge diode 26 (preferably approximately 9 volts when the battery 12 is fully charged). Thus, in the case of a fully charged battery 12 this total voltage will be approximately 17.3 volts, and the capacitor 35 will discharge through the resistor 36 and the LED 37 to deliver a 17.3 volt limited current to the battery 12. Preferably, the value of the resistor 36 is such that this trickle charging current will be in the range of from about 5 ma to about 10 ma. This low level of overcharge current minimizes oxidation effects so as to extend battery life. Thus, during negative half cycles of the AC line voltage the capacitor 35 is charged and that stored charge is then used during the positive half cycles to boost the input voltage and deliver a high-voltage charging current to the battery 12.

The diode 34 prevents the capacitor 35 from discharging through the Zener diode 33, while the LED 37 prevents the battery 12 from discharging through the resistor 36. Also, the LED 37 provides a visible indication that the charging circuit 20 is coupled to the AC supply.

The relatively high-voltage charging current from the capacitor 35 is always available to the battery 12. This offers significant advantages. First of all, if the battery 12 has been deeply discharged, it may have built up sulfate deposits on the electrodes. These deposits cause the battery 12 to have a high internal impedance, thereby causing the Zener diode 33 to go into conduction and preventing the battery 12 from accepting the high charging current from the diode bridge 25. In this event, the relatively high-voltage charging current from the capacitor 35 serves to break down the sulfation and permit normal charging to begin.

Also, after the battery 12 has been fully charged and the Zener diode 33 starts conducting, the battery 12 is still being charged from the "charge pump" provided by the capacitor 35. This tends to pull the battery terminal voltage above the specified full-charged voltage, but with a very limited current. Thus, the diode 31 becomes back biased, thereby forcing the current from the high current source, i.e., the diode bridge 25, to be delivered through the Zener diode 33. Thus, the capacitor 35 provides a "trickle" charge current for the battery 12 which is within acceptable limits.

In a constructional model of the present invention, the coupling capacitor 23 provides approximately 8 volts R.M.S. and approximately 140 ma to the diode bridge 25. The breakdown voltage of the Zener diode 33 is approximately 4.6 volts with a tolerance of 2%. The capacitor 23 may have a value of 3.3 microfarads while the capacitor 35 may be a 10 microfarad capacitor. The resistor 30 may be a 15-ohm, 0.5-watt resistor, while the resistor 36 may be a 390-ohm, 0.5-watt resistor. The breakdown voltage of the Zener diode 33 is such that the charging circuit 20 is adapted for charging two battery cells in series, each being rated at 2 volts, with a charging voltage of 2.35 to 2.45 volts. However, it will be appreciated that the charging circuit 20 could be adapted for charging other sizes of batteries and the component values would be selected accordingly, depending upon the charging rate desired.

From the foregoing, it can be seen that there has been provided an improved battery charging circuit which is of extremely simple and economical construction providing for two-step constant current charging of rechargeable batteries and regulated voltage for the high charging current without the use of a transformer or any active circuit elements. There has also been provided a unique flashlight circuit having built thereinto the charging circuit of the present invention.

I claim:

1. A charging circuit for charging a low voltage battery from an AC supply voltage, said charging circuit comprising: input terminals adapted to be connected to the AC supply and output terminals adapted to be connected to an associated battery, first and second charging means, means capacitively coupling said first and second charging means to said input terminals, said first charging means including means for providing to the battery at said output terminals a rectified relatively large charging current at a relatively low output voltage, said second charging means including means for providing to the battery at said output terminals during alternate half cycles of the AC supply voltage a limited charging current at a relatively high output voltage, said first charging means including control means for terminating the current flow from said first charging means to said output terminals when the voltage of the associated battery reaches a predetermined level.

2. The charging circuit of claim 1, wherein said first charging means includes a full-wave rectifying means.

3. The charging circuit of claim 2, wherein said rectifying means comprises a diode bridge rectifier.

4. The charging circuit of claim 1, wherein said second charging means includes indicating means responsive to the limited charging current for indicating that the charging circuit is operative.

5. The charging circuit of claim 1, wherein said control means includes a Zener diode.

6. The charging circuit of claim 1, wherein said first and second charging means include only passive circuit elements.

7. A charging circuit for charging a low voltage battery from an AC supply voltage, said charging circuit comprising: rectifying means having an input coupled to the AC supply and an output, said rectifying means providing at its output a rectified AC input voltage, a storage capacitor coupled to the AC supply, capacitor charging means connected between said rectifying means output and said storage capacitor and operative during alternate half cycles of the AC supply voltage for charging said storage capacitor to a relatively high voltage, and discharge means coupled to said storage capacitor for delivering therefrom to the associated battery a limited charging current at a relatively high voltage during the remaining half cycles of the AC supply voltage.

8. The charging circuit of claim 7, and further including a coupling capacitor connected between said rectifying means input and the associated AC supply.

9. The charging circuit of claim 7, wherein said capacitor charging means includes unidirectional current means preventing current flow from said storage capacitor to the output of said rectifying means.

10. The charging circuit of claim 7, wherein said discharge means includes a relatively high impedance means for limiting the charging current from said storage capacitor.

11. The charging circuit of claim 7, wherein said discharge means includes unidirectional current means for preventing flow of current from the battery to said storage capacitor.

12. The charging circuit of claim 11, wherein said unidirectional current means comprises a lightemitting diode.

13. A charging circuit for charging a low voltage battery from an AC supply voltage, said charging circuit comprising: full-wave rectifying means having an input and an output, means coupling the AC supply to said input for providing thereat an AC input voltage, said rectifying means being responsive to said AC input voltage for producing at said output a rectified relatively large charging current at a relatively low output voltage, control means coupling said output to the associated battery for terminating the current flow from said output to the battery when the voltage of the battery reaches a predetermined level, a storage capacitor connected to said coupling means, capacitor charging means connected between said output and said storage capacitor and operative during alternate half cycles of the input voltage for charging said storage capacitor to a relatively high voltage, and discharge means coupled to said storage capacitor for delivering therefrom to the associated battery a limited charging current at a relatively high voltage during the remaining half cycles of the AC input voltage.

14. The charging circuit of claim 13, wherein said coupling means includes a capacitor connected in series between the AC supply and said rectifying means input.

15. The charging circuit of claim 13, wherein said capacitor charging means includes unidirectional current means preventing current flow from said storage capacitor to said rectifying means output.

16. The charging circuit of claim 13, wherein said control means includes a Zener diode.

17. The charging circuit of claim 13, wherein said discharge means includes a relatively high impedance means for limiting the charging current from said storage capacitor.

18. The charging circuit of claim 13, wherein said discharge means includes unidirectional current means for preventing flow of current from the battery to said storage capacitor.

19. The charging circuit of claim 7, wherein said rectifying means comprises a diode bridge.

20. The charging circuit of claim 13, wherein said rectifying means comprises a diode bridge.

* * * * *